(No Model.)

T. E. MURRAY.
ROD PACKING.

No. 444,055. Patented Jan. 6, 1891.

Witnesses:

Inventor:

THOMAS E. MURRAY, by William N. Low,
Attorney.

UNITED STATES PATENT OFFICE.

THOMAS E. MURRAY, OF ALBANY, NEW YORK, ASSIGNOR OF TWO-THIRDS TO ROBERT C. BLACKALL AND EDWARD A. MAHER, BOTH OF SAME PLACE.

ROD-PACKING.

SPECIFICATION forming part of Letters Patent No. 444,055, dated January 6, 1891.

Application filed July 15, 1890. Serial No. 358,823. (No model.)

*To all whom it may concern:*

Be it known that I, THOMAS E. MURRAY, of the city and county of Albany, in the State of New York, have invented new and useful Improvements in Rod-Packing, of which the following is a specification.

My invention relates to improvements in metallic packing for piston-rods, valve-rods, and other similar parts of machines; and the object of my invention is to provide a simple, reliable, and enduring packing for the rods of steam-engines, pumps, and other machines which require tight joints around their movable rods. This object I attain by the mechanism illustrated in the accompanying drawings, which are herein referred to, and form part of this specification, in which—

Figure 2:
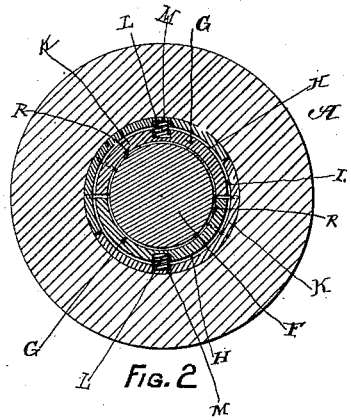
Figure 1:
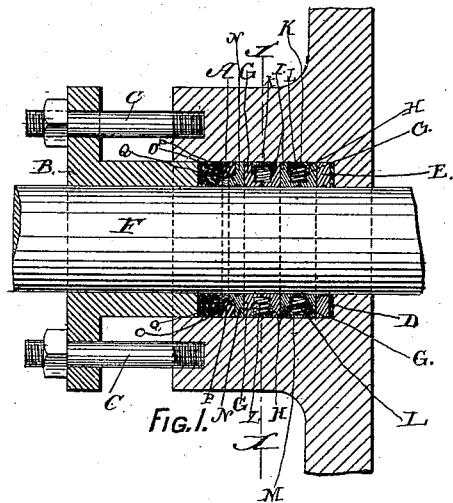
Figure 4:
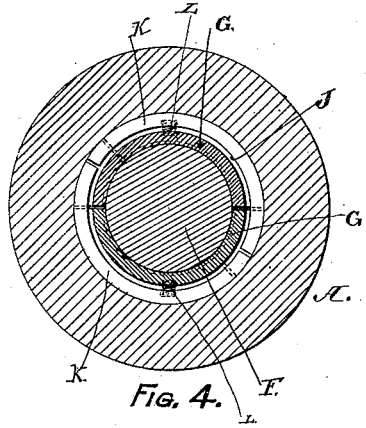
Figure 3:
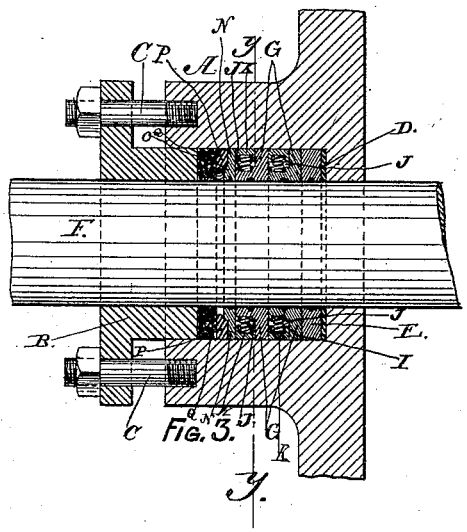

Figure 1 is a vertical section of the stuffing-box and one form of my rod-packing, the rod being shown in side elevation. Fig. 2 is a transverse section of the same at the line X X. Fig. 3 is a vertical section of a stuffing-box containing a modified form of my rod-packing with the rod shown in side elevation, and Fig. 4 is a transverse section of the same at the line Y Y.

As represented in the drawings, A designates the stuffing-box of the cylinder of a steam-engine. The inner end of said stuffing-box is preferably made with a flat surface for the purpose of affording a suitable seat for my packing; but in cases where my packing is applied to stuffing-boxes having a coniform inner end a bottom ring having one of its faces fitted to the conical form of said inner end, and its opposite face being flat, may be inserted in said stuffing-box for the purpose of forming a suitable seat for my packing.

B is the gland for the stuffing-box A, which is forced into said stuffing-box by means of the usual gland-bolts C. The inner end of said gland should be made flat for the purpose of obtaining a uniform pressure against the outer end of the packing contained in the stuffing-box.

D is an annular gasket of india-rubber or other elastic material, which is preferably inserted in the inner end of the stuffing-box A for the purpose of forming a seat for a metallic base-ring E, which forms the inner ring of my packing.

F designates the rod, which reciprocates through the stuffing-box A, and which may be attached to a piston, valve, or other internal part of a machine whose rods require to be protected to prevent leakage at their joints with the adjoining parts.

G designates the metallic packing-rings, which bear against the periphery of the rod F. Said rings are made in segments of two or more equal parts, and, as shown in Figs. 1 and 2, said rings are each provided with a circumferential groove H on its periphery, and thereby circumferential flanges I are formed at each side of said groove; but, as shown in Figs. 3 and 4, one of said circumferential flanges may be dispensed with, and by so doing a circumferential rabbet J will be formed in one face of said packing-rings. The latter are fitted into the stuffing-box A in such manner that their solid portions will cover the radial joints of the adjoining ring, so as to form break joints therewith, and sufficient space should be left between the adjacent ends of the segments to allow for any possible wear of the bore of the rings against the surface of the rod F.

K designates the supplementary rings of my packing, which bear against the bore of the stuffing-box A. Said rings are made of metal and are separated into segments, which correspond to the segments of the packing-rings G, and the segments of said supplementary rings are so arranged that their radial joints will come at the solid portions of the packing-rings G, and will not correspond in position with the joints of any other rings. Thereby proper break joints are formed in the different layers of the rings of both kinds.

L designates the springs, which are interposed between the packing-rings G and the supplementary rings K. As shown in the drawings, said springs are made in a spiral form with their opposite ends inserted in recesses M, formed in the adjacent faces of said rings, whereby the segments of said rings are retained in proper relative position endwise, and the packing-rings G are pressed against the surface of the rod F. When preferred, the form of said springs may be varied, and the mode of retaining said springs in position may be changed to suit the requirements of the case.

N designates a cap-ring, which is fitted to cover the outer layer of my packing. Said ring is preferably provided with an annular tongue O, whose smaller diameter corresponds to the bore of said ring, said tongue being provided for the purpose of holding a packing-ring P, of rubber or other elastic material, in contact with the bore of the stuffing-box A, and for preventing said ring from being pressed into contact with the surface of the rod F. The diameter of said ring is slightly greater than the bore of said stuffing-box, so that said ring will require to be compressed to effect its insertion in the stuffing-box.

Q designates a junk-ring or gasket of fibrous packing or other material which does not possess the quality of being too easily compressed, and which will not gum or otherwise detrimentally smear the rod F while the latter is reciprocating through said ring. Said junk-ring receives the pressure applied to the gland B, and transmits said pressure to the several rings interposed between said gland and the inner end of the stuffing-box A. Preferably the bore of the base-ring E, packing-rings G, and the cap-ring N are each provided with a circumferential groove R, for the purpose of preventing the discharge of any liquid through the joint formed between the rod F and the bore of the packing.

What I claim as my invention, and desire to secure by Letters Patent, is—

The metallic packing for rods herein described, the same consisting of a series of metallic packing-rings G, separated into segmental pieces, each of said rings being provided with a circumferential groove or rabbet H on its perimeter, a like series of metallic supplemental rings K, separated into segmental pieces corresponding in length and form to the segmental pieces of the packing-rings G, and fitted to enter the grooves of the latter, the radial joints of both series of segmental pieces being arranged to form break joints with the different layers of said rings, springs L, interposed between said packing-rings and supplemental rings at the line of their curvilinear separation, an elastic cushion P, and a semi-elastic junk-ring Q, interposed between the upper layer of packing-rings G and gland B, as and for the purpose specified.

THOMAS E. MURRAY.

Witnesses:
 WM. H. LOW,
 S. B. BREWER.